United States Patent
Mackenzie (10) Patent No.: US 12,058,063 B2
(45) Date of Patent: Aug. 6, 2024

(54) CELLULAR TELECOMMUNICATIONS NETWORK

(71) Applicant: BRITISH TELECOMMUNICATIONS PUBLIC LIMITED COMPANY, London (GB)

(72) Inventor: Richard Mackenzie, London (GB)

(73) Assignee: British Telecommunications Public Limited Company (GB)

(*) Notice: Subject to any disclaimer, the term of this patent is extended or adjusted under 35 U.S.C. 154(b) by 363 days.

(21) Appl. No.: 17/250,881

(22) PCT Filed: Sep. 2, 2019

(86) PCT No.: PCT/EP2019/073331
§ 371 (c)(1),
(2) Date: Mar. 18, 2021

(87) PCT Pub. No.: WO2020/057952
PCT Pub. Date: Mar. 26, 2020

(65) Prior Publication Data
US 2022/0052804 A1    Feb. 17, 2022

(30) Foreign Application Priority Data
Sep. 21, 2018   (EP) .................................... 18195909

(51) Int. Cl.
*H04L 5/00* (2006.01)
*H04W 24/02* (2009.01)
*H04W 88/08* (2009.01)

(52) U.S. Cl.
CPC .......... *H04L 5/0037* (2013.01); *H04L 5/0044* (2013.01); *H04L 5/0048* (2013.01); *H04W 88/085* (2013.01)

(58) Field of Classification Search
None
See application file for complete search history.

(56) References Cited

U.S. PATENT DOCUMENTS

| 5,384,824 | A  | 1/1995 | Alvesalo |
| 6,324,405 | B1 | 11/2001 | Young et al. |

(Continued)

FOREIGN PATENT DOCUMENTS

| CN | 102726100 A | 10/2012 |
| CN | 107734568 A | 2/2018 |

(Continued)

OTHER PUBLICATIONS

3GPP TR 38.801 V14.0.0 "3rd Generation Partnership Project; Technical Specification Group Radio Access Network; Study on New Radio Access Technology: Radio Access Architecture and Interfaces (Release 14)," Mobile Competence Centre, 2017, pp. 1-91.

(Continued)

*Primary Examiner* — Jeffrey M Rutkowski
*Assistant Examiner* — Ning Li
(74) *Attorney, Agent, or Firm* — Pranger Law PC (57) ABSTRACT

This disclosure provides a method in a cellular telecommunications network, the cellular telecommunications network having a first central base station unit connecting to a first distributed base station unit, the method including the first central base station unit communicating with the first distributed base station unit using a first functional split in which a first set of protocol functions are implemented by the first central base station unit and a second set of protocol functions are implemented by the first distributed base station unit; determining that a processing resource utilization of at least one of the first central base station unit and first distributed base station unit using the first functional split satisfies a processing threshold; and, in response, causing the first central base station unit and first distributed base station unit to communicate using a second functional split in which a third set of protocol functions are imple- (Continued)

mented by the first central base station unit and a fourth set of protocol functions are implemented by the first distributed base station unit.

12 Claims, 10 Drawing Sheets

(56) References Cited

U.S. PATENT DOCUMENTS

| | | | |
|---|---|---|---|
| 7,400,901 B2 | 7/2008 | Kostic et al. | |
| 8,731,563 B2 | 5/2014 | Yi | |
| 8,897,264 B2 | 11/2014 | Samdanis | |
| 8,897,788 B2 | 11/2014 | Ruuska | |
| 9,042,258 B2 | 5/2015 | Jung et al. | |
| 9,282,528 B2 | 3/2016 | Hashimoto | |
| 9,432,991 B2 | 8/2016 | Khandekar et al. | |
| 9,479,981 B2 | 10/2016 | Dimou et al. | |
| 9,510,206 B2 | 11/2016 | Liu et al. | |
| 9,814,021 B2 | 11/2017 | Himayat et al. | |
| 9,883,431 B2 | 1/2018 | Venkatraman et al. | |
| 10,219,165 B2 | 2/2019 | Futaki | |
| 10,993,155 B2 | 4/2021 | Mackenzie | |
| 11,019,547 B1 | 5/2021 | Oroskar et al. | |
| 11,109,450 B2* | 8/2021 | Xu | H04W 48/18 |
| 11,184,869 B2 | 11/2021 | Abedini et al. | |
| 11,240,780 B2 | 2/2022 | Park et al. | |
| 11,546,819 B2 | 1/2023 | Fitch et al. | |
| 2012/0218886 A1 | 8/2012 | Van et al. | |
| 2013/0021929 A1 | 1/2013 | Kim | |
| 2013/0157676 A1 | 6/2013 | Baek et al. | |
| 2014/0056243 A1 | 2/2014 | Pelletier et al. | |
| 2014/0071884 A1 | 3/2014 | Sherman | |
| 2014/0135031 A1 | 5/2014 | Weiguo | |
| 2014/0220963 A1 | 8/2014 | Jung et al. | |
| 2014/0269322 A1 | 9/2014 | Li et al. | |
| 2016/0174241 A1 | 6/2016 | Ansari et al. | |
| 2016/0219475 A1 | 7/2016 | Kim | |
| 2016/0262163 A1 | 9/2016 | Gonzalez Garrido et al. | |
| 2016/0323756 A1 | 11/2016 | Shen et al. | |
| 2017/0111831 A1 | 4/2017 | Xiao et al. | |
| 2017/0310437 A1 | 10/2017 | Bottari et al. | |
| 2018/0076877 A1 | 3/2018 | Liu et al. | |
| 2018/0115990 A1 | 4/2018 | Abedini et al. | |
| 2018/0234882 A1 | 8/2018 | Cho et al. | |
| 2018/0241452 A1 | 8/2018 | Akkarakaran et al. | |
| 2018/0255507 A1 | 9/2018 | Nagasaka et al. | |
| 2018/0270894 A1 | 9/2018 | Park et al. | |
| 2018/0324780 A1 | 11/2018 | Novlan et al. | |
| 2018/0337846 A1 | 11/2018 | Lee et al. | |
| 2019/0028174 A1 | 1/2019 | Chakraborty et al. | |
| 2019/0074882 A1 | 3/2019 | Zhou et al. | |
| 2019/0124577 A1* | 4/2019 | Li | H04L 41/40 |
| 2019/0174561 A1* | 6/2019 | Sivavakeesar | H04W 48/12 |
| 2019/0230697 A1 | 7/2019 | Yang et al. | |
| 2019/0289478 A1 | 9/2019 | Hosseini et al. | |
| 2019/0296882 A1 | 9/2019 | Li et al. | |
| 2019/0312713 A1 | 10/2019 | Yang et al. | |
| 2019/0394738 A1 | 12/2019 | Abedini et al. | |
| 2020/0084819 A1* | 3/2020 | Abedini | H04W 76/15 |
| 2021/0076220 A1* | 3/2021 | Hirano | H04W 16/02 |
| 2021/0168671 A1 | 6/2021 | Hong | |
| 2021/0219197 A1* | 7/2021 | Prasad | H04W 36/08 |
| 2021/0227435 A1 | 7/2021 | Hsieh | |
| 2021/0243770 A1* | 8/2021 | Roessler | H04W 72/543 |
| 2021/0288879 A1* | 9/2021 | Yao | G06F 9/45537 |
| 2022/0052804 A1 | 2/2022 | Mackenzie | |

FOREIGN PATENT DOCUMENTS

| | | | |
|---|---|---|---|
| CN | 104303577 B | 6/2018 | |
| CN | 104067688 B | 8/2018 | |
| CN | 105103598 B | 2/2019 | |
| CN | 107135055 B | 6/2020 | |
| EP | 2753143 A1 | 7/2014 | |
| EP | 2924924 A1 | 9/2015 | |
| EP | 3113532 A1 | 1/2017 | |
| EP | 3363259 A1 | 8/2018 | |
| ES | 2718906 T3 | 7/2019 | |
| GB | 2552844 A | 2/2018 | |
| JP | 2018524920 A | 8/2018 | |
| JP | 2018142940 A | 9/2018 | |
| KR | 20150022240 A | 3/2015 | |
| KR | 101533852 B1 | 7/2015 | |
| RU | 2561859 C2 | 9/2015 | |
| WO | WO-2015093559 A1 | 6/2015 | |
| WO | WO 2018/184201 * | 4/2017 | H04W 8/14 |
| WO | WO-2017197063 A1 | 11/2017 | |
| WO | WO-2018012873 A1 | 1/2018 | |
| WO | WO-2018030819 A1 | 2/2018 | |
| WO | 2018063998 A1 | 4/2018 | |
| WO | WO-2018089803 A1 | 5/2018 | |
| WO | WO-2020057952 A1 | 3/2020 | |

OTHER PUBLICATIONS

3GPP TR 38.801 V2.0.0 "3rd Generation Partnership Project; Technical Specification Group Radio Access Network; Study on New Radio Access Technology: Radio Access Architecture and Interfaces (Release 14)," 2017, pp. 1-90.

3GPP TS 38.401 V15.2.0, "3rd Generation Partnership Project; Technical Specification Group Radio Access Network; NG-RAN; Architecture description (Release 15)," 650 Route des Lucioles— Sophia Antipolis, Jun. 2018, 39 pages.

3GPPT 38.801 V14.0.0, "3rd Generation Partnership Project; Technical Specification Group Radio Access Network; Study on new radio access technology: Radio access architecture and interfaces(Release 14)," (Mar. 2017), 84 pages.

Asensio A., et al., "Dynamic Virtual Network Connectivity Services to Support C-RAN Backhauling," Journal of Optical Communications and Networking, vol. 8 (12), Dec. 2016, pp. B93-B103.

Boulos K., et al., "Interference-Aware Clustering in Cloud Radio Access Networks," IEEE International Conference on Cloud Networking, Sep. 2017, 6 pages.

CATT, "Analysis on Fronthaul Split Options," R2-162570, 3GPP TSGRAN WG2 Meeting #93bis, Agenda Item 9.5.1, Mobile Competence Centre, Apr. 2016, pp. 1-5.

Combined Search and Examination Report under Sections 17 and 18(3) for Great Britain Application No. 1815378.3, mailed on Mar. 4, 2019, 5 pages.

Extended European Search Report for Application No. 18195908.1, mailed on Nov. 28, 2018, 11 pages.

Extended European Search Report for Application No. 18195909.9, mailed on Jan. 16, 2019, 14 pages.

Extended European Search Report for Application No. 19195268.8, mailed on Oct. 1, 2019, 12 pages.

Extended European Search Report for EP Application No. 18190557.1, mailed on Mar. 1, 2019, 10 pages.

Giannone F., et al., "Impact of RAN Virtualization on Fronthaul Latency Budget: An Experimental Evaluation," IEEE Globecom Workshops, Nov. 2, 2017, 6 pages.

Harutyunyan D., et al., "Flexible Functional Split in 5G Networks," 2017, 9 pages.

NGMN, "NGMN Overview on 5G RAN Functional Decomposition," NGMN Alliance, Version. 1.0, Feb. 2018, 48 pages.

Notification of Transmittal of the International Search Report and Written Opinion of the International Searching Authority for Application No. PCT/EP2019/067971, mailed on Aug. 20, 2019, 14 pages.

Notification of Transmittal of the International Search Report and Written Opinion of the International Searching Authority for Application No. PCT/EP2019/073331, mailed on Sep. 25, 2019, 18 pages.

Office Action for GB Application No. 1912675.4, mailed on Feb. 7, 2020, 4 pages.

Office Action For GB Application No. 1815378.3, mailed on Nov. 17, 2020, 2 pages.

(56) References Cited

OTHER PUBLICATIONS

Samsung., "F1AP Function Definition and Categorization," R3-172246, 3GPP TSG-RAN WG3 Meeting Ad Hoc, Mobile Competence Centre, Jun. 2017, 16 pages.
Search Report for GB Application No. 1813777.8, mailed on Feb. 26, 2019, 5 pages.
Search Report under Section 17 for Great Britain Application No. 1815377.5, mailed on Mar. 12, 2019, 4 pages.
Telecom Infra Project, "Creating an ecosystem for vRANs supporting non-ideal fronthaul," 22 pages.
Valastro G.C., et al., "A SDN/NFV Based C-RAN Architecture for 5G Mobile Networks," IEEE, International Conference on Selected Topics in Mobile and Wireless Networking, XP033383120, Jun. 2018, 8 pages.
Written Opinion for Application No. PCT/EP2019/073331, mailed on Sep. 11, 2020, 9 pages.
XRAN Resources, xRAN Fronthaul Control, User and Synchronization Plan Specification Version 2.0 and XRAN Fronthaul Management Plane Specification Version 1.0, https://link.edgepilot.com/s/0072863d/7hupfmBTwkaKtq09Bdxl2w?u=http://www.xran.org/resources/.
Communication pursuant to Article 94(3) EPC for European Application No. 19736685.9, mailed on Feb. 16, 2023, 7 pages.
Examination Report for Indian Application No. 202117007647, mailed on May 25, 2022, 5 pages.
Examination Report for Indian Application No. 202117016292, mailed on Feb. 14, 2022, 7 pages.
Intel, "Fronthaul and RAN functional split aspects of the next generation radio access network," 3GPP TSG-RAN WG2#93bis, R2-162713, Intel Corporation, Retrieved from the Internet: URL: http://www.3gpp.org/ftp/tsg_ran/WG2_RL2/TSGR2_93bis/Docs/R2-162713.zip , pages, Apr. 15, 2016, 6 Pages.
International Preliminary Report on Patentability for Application No. PCT/EP2019/073331, mailed on Mar. 9, 2021, 21 pages.
NTT Docomo, Inc., "Presentation of Report to TSG: TR38.801, Version 2.0.0; Study on New Radio Access Technology; Radio Access Architecture and Interfaces," 3GPP TSG RAN #75 RP-170490, Mar. 6, 2017, 14 pages.

Office action for Japanese Application No. 2021510035, mailed on Mar. 22, 2022, 7 pages.
Office Action for Japanese Application No. 2021-515526, mailed on Dec. 13, 2022, 7 pages.
Office Action for Japanese Application No. 2021-515526, mailed on May 24, 2022, 4 pages.
Umesh A., et al., "Standardization Trends for Open and Intelligent Wireless Access Networks," NTT Docomo Technical Journal, vol. 27(1), Telecommunications Association, pp. 43-55.
Wang J., et al., "Distributed Antenna Systems for Mobile Communications in High Speed Trains," IEEE Journal on Selected Areas in Communications, May 2012, vol. 30, No. 4, 99. pp. 675-683.
Office Action received for Chinese Patent Application No. 201980047009.9, mailed on Jun. 30, 2023, 9 pages (English Translation Only).
Chang et al., "FlexCRAN : A flexible Functional Split Framework over Ethernet fronthaul in Cloud-RAN", IEEE International Conference on Communications, 2017, 7 pages.
Intel , "Fronthaul and RAN Functional Split Aspects of the Next Generation Radio Access Network", 3GPP TSG-RAN WG3#91bis, R3-160622, Retrieved from the Internet: URL:http://www.3gpp.org/ftp/tsg_ran/WG2_RL2/TSGR2_93bis/Docs/R2-162713.zip, Apr. 11-15, 2016, 6 pages.
Office Action received for Japanese Patent Application No. 2021-515526, mailed Oct. 24, 2023, for dated Oct. 24, 2023, 7 pages (English Translation Only).
Office Action received for Chinese Patent Application No. 201980060179.0, mailed Nov. 30, 2023, 8 pages, (English Translation Only).
"xRAN Resources, xRAN Fronthaul Control, User and Synchronization Plan Specification Version 2.0 and XRAN Fronthaul Management Plane Specification", Version 1.0, https://link.edgepilot.com/s/0072863d/7hupfmBTwkaKtq09Bdxl2w?u=http://www.xran.org/resources/., Feb. 16, 2019.
Telecom Infra Project , "Creating an ecosystem for vRANs supporting non-ideal fronthaul", Feb. 16, 2019, pp. 1-22.

\* cited by examiner

Figure 3a
Time, $t_1$

Figure 3b
Time, $t_2$

Figure 3c
Time, $t_3$

Figure 3d
Time, $t_4$

Figure 4

Figure 5a
Time, $t_{11}$

Figure 5b
Time, $t_{12}$

Figure 6

CELLULAR TELECOMMUNICATIONS NETWORK

PRIORITY CLAIM

The present application is a National Phase entry of PCT Application No. PCT/EP2019/073331, filed Sep. 2, 2019, which claims priority from EP Patent Application No. 18195909.9, filed Sep. 21, 2018, each of which is hereby fully incorporated herein by reference.

TECHNICAL FIELD

The present disclosure relates to a cellular telecommunications network. In particular, it relates to a cellular telecommunications network implementing a centralized radio access network.

BACKGROUND

Modern cellular networks support Centralized Radio Access Network (C-RAN) architectures in which a base station may be split into a central unit and a distributed unit. The central unit interconnects a core cellular network with a plurality of distributed units, and the plurality of distributed units each communicate with a plurality of UEs. The various protocol layers of the cellular protocol in use are split between the central and distributed units such that the distributed units implement the lowermost layer (e.g. the radio frequency layer) and optionally one or more higher layers, and all other higher layers are implemented in the central unit. As more protocol layers are implemented in the central unit, then the central unit may improve coordination across multiple distributed units and thereby improve Quality of Service. However, different protocol splits have different resource demands, such as relatively higher capacity links between the central and distributed units when using relatively lower layer protocol splits, so the choice of protocol split must be suited to the network characteristics.

SUMMARY

According to a first aspect of the disclosure, there is provided a method in a cellular telecommunications network, the cellular telecommunications network having a first central base station unit connecting to a first distributed base station unit, the method comprising the first central base station unit communicating with the first distributed base station unit using a first functional split in which a first set of protocol functions are implemented by the first central base station unit and a second set of protocol functions are implemented by the first distributed base station unit; determining that a processing resource utilization of at least one of the first central base station unit and first distributed base station unit using the first functional split satisfies a processing threshold; and, in response, causing the first central base station unit and first distributed base station unit to communicate using a second functional split in which a third set of protocol functions are implemented by the first central base station unit and a fourth set of protocol functions are implemented by the first distributed base station unit.

The method may further comprise identifying the second functional split based on a comparison of the processing resource utilization of at least one of the first central base station unit and first distributed base station unit using the second functional split to a respective processing resource capability of the first central base station unit and/or first distributed base station unit.

The comparison may be of the processing resource utilization of at least one of the first central base station unit and first distributed base station unit using the second functional split and operating according to a set of operating conditions to the respective processing resource capability of the first central base station unit and/or first distributed base station unit. The set of operating conditions may relate to access radio conditions. The set of operating conditions may include a quality of a connection between the first central base station unit and the first distributed base station unit.

The first central base station unit and first distributed base station unit may be connected via a relay node, and the set of operating conditions may include a quality of a connection between the first distributed base station unit and the relay node.

According to a second aspect of the disclosure, there is provided a computer program product comprising instructions which, when the program is executed by a computer, cause the computer to carry out the method of a first aspect of the disclosure. The computer program may be stored on a computer-readable data carrier.

According to a third aspect of the disclosure, there is provided a network node for a cellular telecommunications network, the cellular telecommunications network having a first central base station unit connecting to a first distributed base station unit, wherein the first central base station unit communicating with the first distributed base station unit using a first functional split in which a first set of protocol functions are implemented by the first central base station unit and a second set of protocol functions are implemented by the first distributed base station unit, the network node comprising: a communications interface adapted to receive data indicating a processing resource utilization of at least one of the first central base station unit and first distributed base station unit using the first functional split; and a processor adapted to: determine that the processing utilization satisfies a processing threshold, and, in response, cause the first central base station unit and first distributed base station unit to communicate using a second functional split in which a third set of protocol functions are implemented by the first central base station unit and a fourth set of protocol functions are implemented by the first distributed base station unit.

The network node may be a network function virtualization orchestrator.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
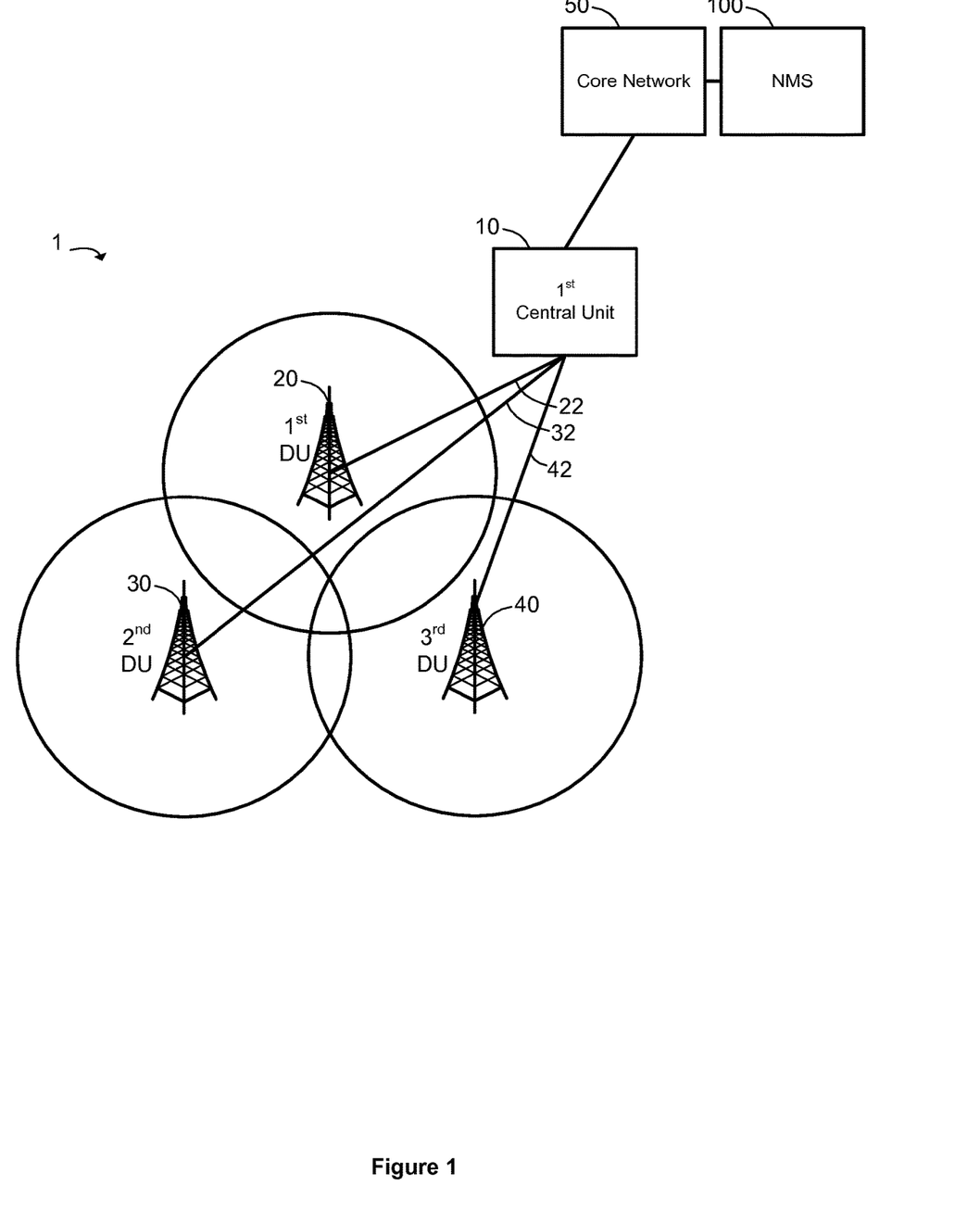
FIG. 1 is a schematic diagram of an embodiment of a cellular telecommunications network of the present disclosure.

A first embodiment of a cellular telecommunications network 1 will now be described with reference to FIGS. 1 and 2. The cellular telecommunications network 1 is based on a Centralized Radio Access Network (C-RAN) architecture having a first central unit 10, and first, second and third distributed units ("1$^{st}$/2$^{nd}$/3$^{rd}$ DU" in the FIGS. 20, 30, 40. The first central unit 10 is connected to the first, second and third distributed units 20, 30, 40 via first, second and third backhaul connections 22, 32, 42 respectively, and interconnects each of the first, second and third distributed units 20, 30, 40 to a cellular core network 50 (including a Network Management System (NMS) 100). The coverage areas of each of the first, second and third distributed units 20, 30, 40 are shown by their respective enveloping circles.

Figure 2:
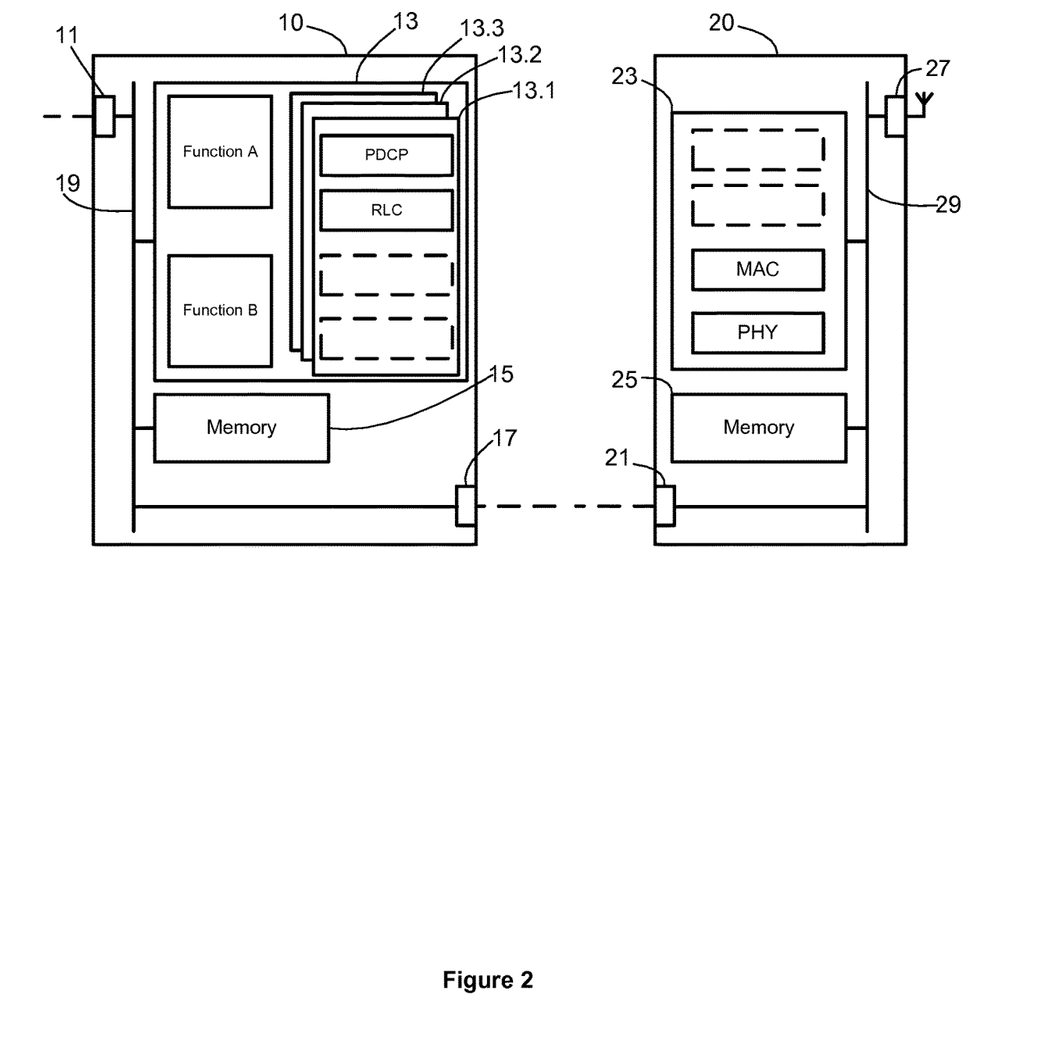
FIG. 2 is a schematic diagram of a central base station unit and distributed base station unit of the network of FIG. 1.

FIG. 2 illustrates the central unit 10 and the first distributed unit 20 in more detail. As shown, the central unit 10 has a first transceiver 11, a processor 13, memory 15, and a second transceiver 17, all connected via bus 19. The first transceiver 11 is a wired communications interface such that the central unit 10 may communicate with one or more cellular core networking nodes (such as the NMS 100). In this embodiment, the second transceiver 17 is a wired communications interface such that the central unit 10 may communicate with each of the first, second, and third distributed units 20, 30, 40. The transceivers, processor and memory are configured to cooperate to define a Software Defined Networking (SDN) operating environment, allowing the central unit 10 to reconfigure on demand.

Furthermore, the first distributed unit 20 also includes a first transceiver 21 for wired communication with the central unit 10, a processor 23, memory 25, a second transceiver 27 for wireless communication with one or more User Equipment (UE), all connected via bus 29. Similarly, the transceivers, processor and memory are configured to cooperate to define a Software Defined Networking (SDN) operating environment, allowing the first distributed unit 20 to reconfigure on demand.

In this embodiment, the central unit processor 13 is configured to implement individual processing environments for processing communications with each distributed unit, such that it has a first communication processing environment 13.1 for processing communications with the first distributed unit 20, a second communication processing environment 13.2 for processing communications with the second distributed unit 30, and a third communication processing environment 13.3 for processing communications with the third distributed unit 40. The central unit processor 13 is also configured to implement further processing environments for implementing other processing functions, and first and second further processing environments are shown in FIG. 2.

FIG. 2 also illustrates the first communication processing environment 13.1 of the central unit 10 and the processor 23 of the first distributed unit 20 implementing different functions of their operating protocol (which, in this embodiment, is the Long Term Evolution (LTE) protocol). The various functions of the LTE protocol are split between the respective processors 13.1, 23 of the central unit 10 and first distributed unit 20 such that the first distributed unit 20 implements the physical (PHY) function and Medium Access Control (MAC) function, and the central unit 10 implements the Radio Link Control (RLC) function, and Packet Data Convergence Control (PDCP) function. In doing so, the central unit 10 may coordinate transmissions of several distributed units to improve Quality of Service (QoS) in the cellular network 1.

The processors of the central unit 10 and first distributed unit 20 are able to reconfigure (as they operate SDN environments) to implement different functional splits, such as:

A) First Distributed Unit 20: Lower PHY, Central Unit 10, Higher PHY, MAC, RLC, PDCP;

B) First Distributed Unit 20: PHY, Central Unit 10: MAC, RLC, PDCP;

C) First Distributed Unit 20: PHY, MAC, Central Unit 10: RLC, PDCP (as shown);

D) First Distributed Unit 20: PHY, MAC, RLC Central Unit 10: PDCP;

E) First Distributed Unit 20: PHY, MAC, RLC, PDCP Central Unit 10: N/A;

Furthermore, the central unit 10 and first distributed unit 20 may implement further functions (in which case further functional splits would be possible).

At any one time, the first central unit 10 is therefore configured to implement any one of the functional splits in its communication processing environments and implement one or more further processing functions in its further processing environments.

In this embodiment, the second and third distributed units 30, 40 are similar to the first distributed unit 20, and the second and third communication processing environments 13.2, 13.3 are similar to the first communication processing environment 13.1.

Figure 3A:
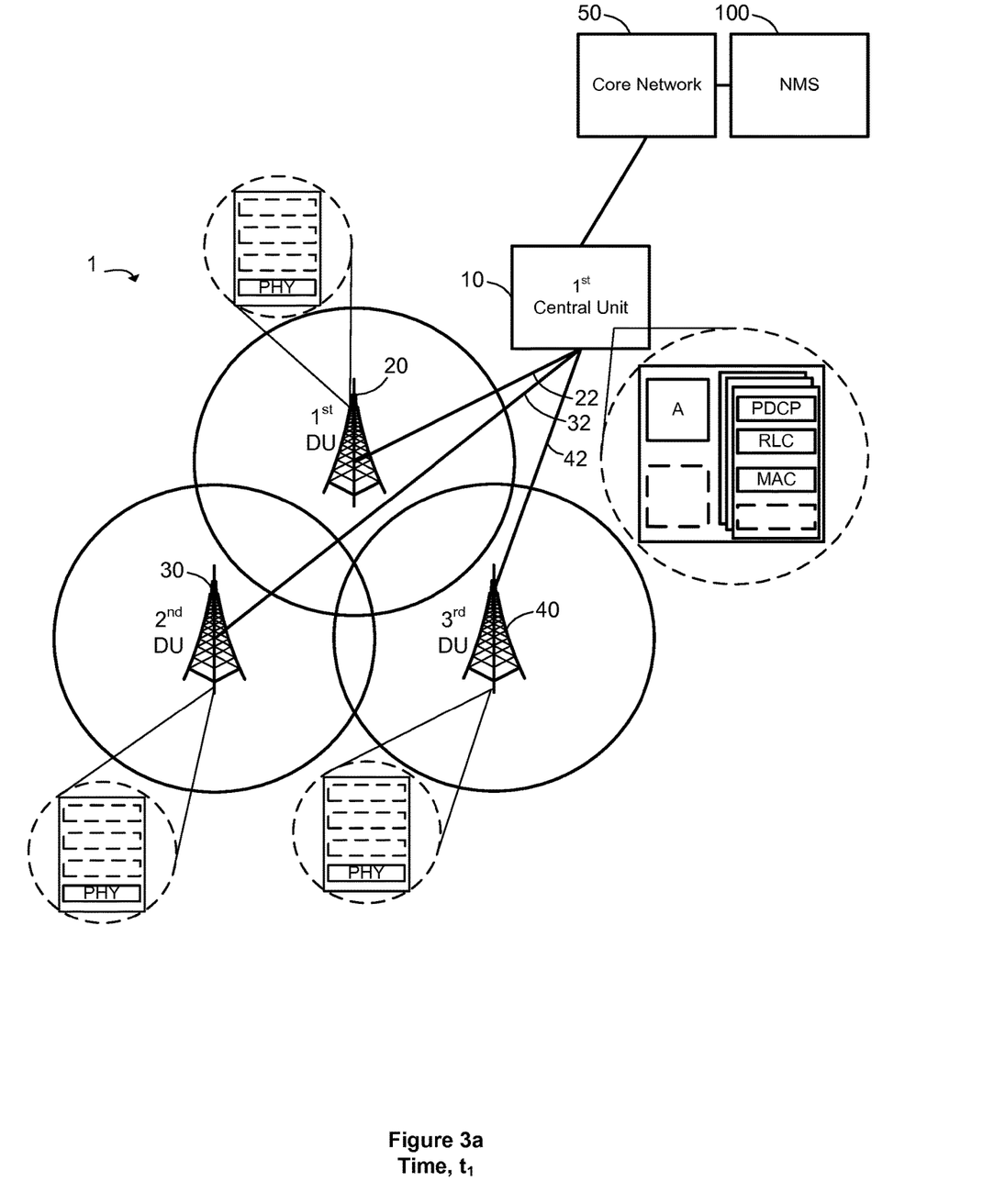
FIGS. 3a to 3d illustrate the network of FIG. 1 at times $t_1$, $t_2$, $t_3$ and $t_4$ respectively.
Figure 4:
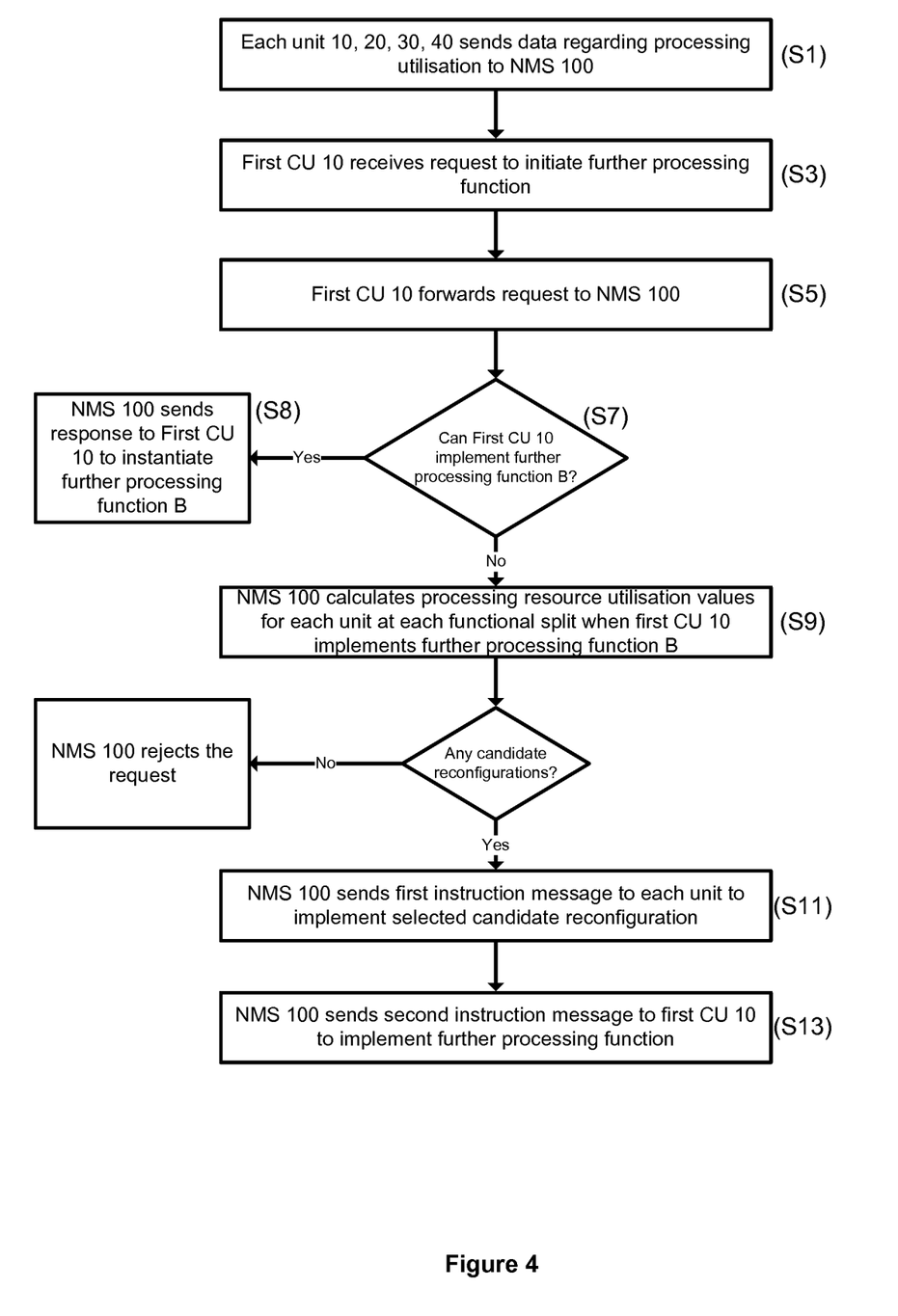
FIG. 4 is a flow diagram of a first embodiment of a method of the present disclosure.

A first embodiment of a method of the present disclosure will now be described with reference to FIGS. 3a to 3d and the flow chart of FIG. 4. FIG. 3a illustrates the cellular telecommunications network 1 at time $t_1$, in which the first central unit 10 is communicating with each of the first, second and third distributed units 20, 30, 40 using a first functional split in which the first central unit 10 implements the MAC, RLC and PDCP functions and each of the first, second and third distributed units 20, 30, 40 implement the PHY function (functional split B, as noted above). Furthermore, the first central unit 10 implements a first further processing function A in its respective first further processing environment. The second further processing function B is not being implemented at this time.

The NMS 100 includes Virtual Infrastructure Manager (VIM) and orchestrator modules. The orchestrator module is a processor for determining where virtual functions should be implemented in the cellular network, and the VIM communicates these decisions to the relevant entities. In this example, the NMS 100 also stores a database in memory identifying the processing utilization values (e.g. in Millions of Instructions Per Second, MIPS; FLOating Point operations per Second, FLOPS; number of Central Processing Units, CPUs; and/or number of processing cores) for the first central unit 10 and each of the first, second and third distributed units 20, 30, 40 when implementing each functional split (A to E, identified above). These may (at least initially) be operator defined values, but may also be updated by reported values from units 10, 20, 30, 40 (and also as a function of reported values from other C-RANs). An example of this database is shown in Table 1, below:

TABLE 1

Table illustrating processing utilization
values, $P_n$, at each functional split

| Functional Split | 1st CU 10 | 1st DU 20 | 2nd DU 30 | 3rd DU 40 |
|---|---|---|---|---|
| A | $P_1$ | $P_2$ | $P_3$ | $P_4$ |
| B | $P_5$ | $P_6$ | $P_7$ | $P_8$ |
| C | $P_9$ | $P_{10}$ | $P_{11}$ | $P_{12}$ |
| ... | ... | ... | ... | ... |

In S1, the first central unit 10 and first, second and third distributed units 20, 30, 40 periodically send data to the NMS 100 regarding their processing resources. In this embodiment, the data relates to a) each unit's current processing resource utilization value, and b) each unit's current processing capability. These are stored in memory in the NMS 100.

Figure 3B:
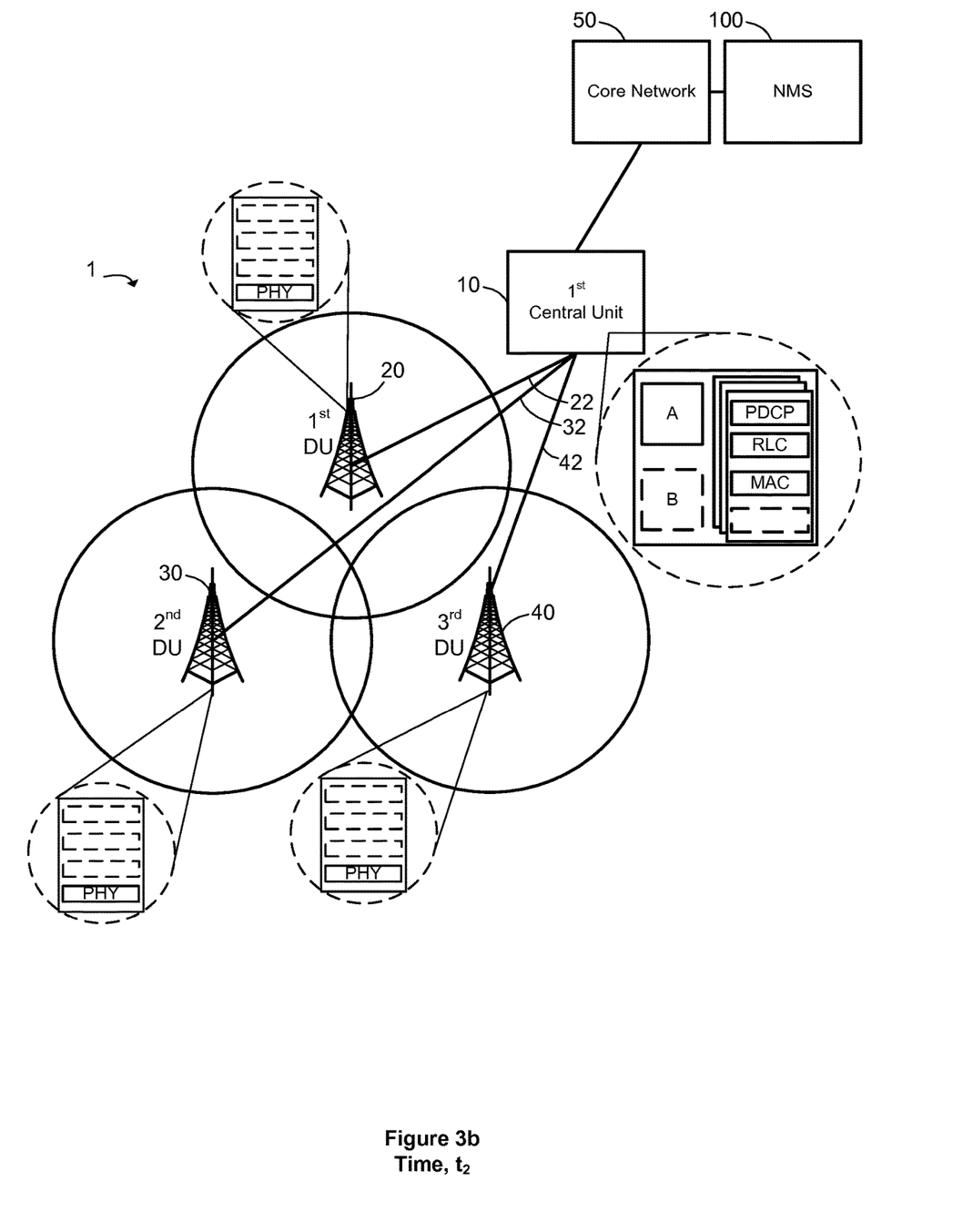

In S3 at time $t_2$, the first central unit 10 receives a request to initiate further processing function B (this is illustrated in FIG. 3b by the further processing environment having label B, but still having an enveloping dotted line to indicate that the request has not yet been implemented). In S5, the first central unit 10 forwards this request to the NMS 100 for approval, together with data identifying the additional processing resource requirement to implement further processing function B (e.g. in MIPS, FLOPS, CPUs or cores).

In S7, the NMS 100 determines whether the requesting entity (the first central unit 10) can implement further processing function B. In this example, this is by addition of the first central unit's current processing resource utilization value (stored in memory in NMS 100 in S1) to the additional processing resource requirement to implement further processing function B (identified in the data from S5), and a comparison of this sum to the first central unit's current processing capability (also stored in memory in NMS 100 in S1). If the determined processing resource utilization for the first central unit 10 when implementing further processing function B is less than its processing capability (or a derivative, such as 95%, thereof), then the request is approved and the process proceeds to S8 in which the NMS 100 sends a response message to the first central unit 10 indicating that further processing function B may be instantiated. However, if the determined processing resource utilization for the first central unit 10 is greater than the processing resource capability value, then the process moves to S9.

In S9, the NMS 100 calculates a processing resource utilization value for the first central unit 10 and each of the first, second and third distributed units 20, 30, 40 when the communications processing environments implement a different functional split, and when the first central unit 10 implement the first and second further processing functions. In this example, this is achieved by retrieving the processing utilization values for the first central unit 10 and first, second and third distributed units 20, 30, 40 when using each functional split from the NMS's database, and adding the additional processing resource requirement for further processing function B to the retrieved processing utilization value for the first central unit 10 at each functional split. If the processing utilization values for all the first, second and third distributed unit 20, 30, 40 when implementing a particular functional split and the processing utilization value for the first central unit 10 when implementing the particular functional split and adding the additional processing resource requirement of function B are below their corresponding processing resource capability values (or a derivative thereof), then that particular functional split becomes a candidate reconfiguration.

If there are no candidate reconfigurations following S9, then the request is rejected and the process skips to S10 in which the NMS 100 sends a response message to the first central unit 10 indicating that the further processing function B cannot be instantiated. However, if there are multiple candidate reconfigurations following S9, then, in this example, the NMS 100 selects the functional split of one of these candidates which has the greatest degree of coordination (i.e. greatest number of functions being implemented in the first central unit 10). If a single candidate reconfiguration is identified in S9, then the functional split of that candidate is selected. In this example, functional split D (as noted above) is selected and the process proceeds to S11.

Figure 3C:
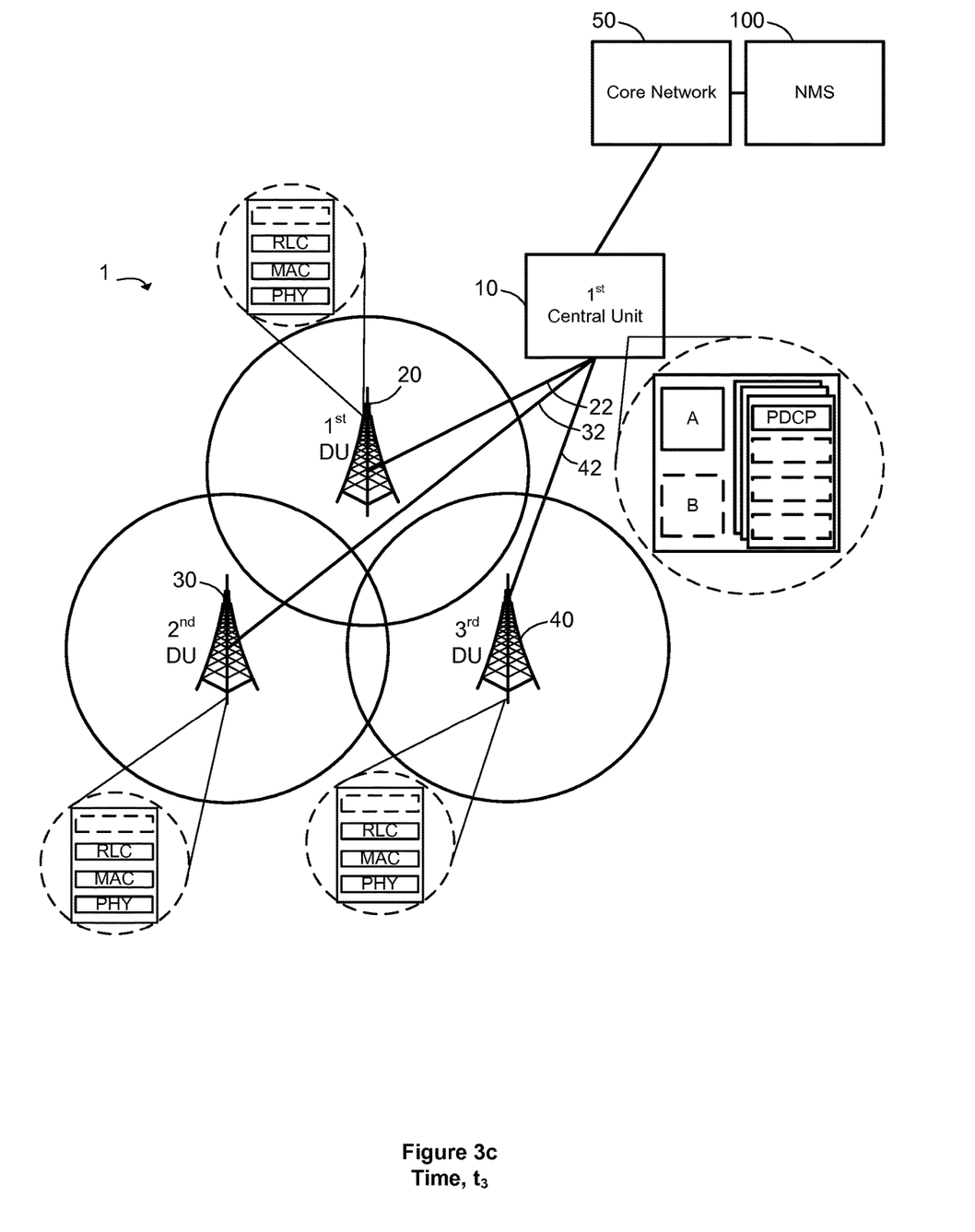
Figure 3D:
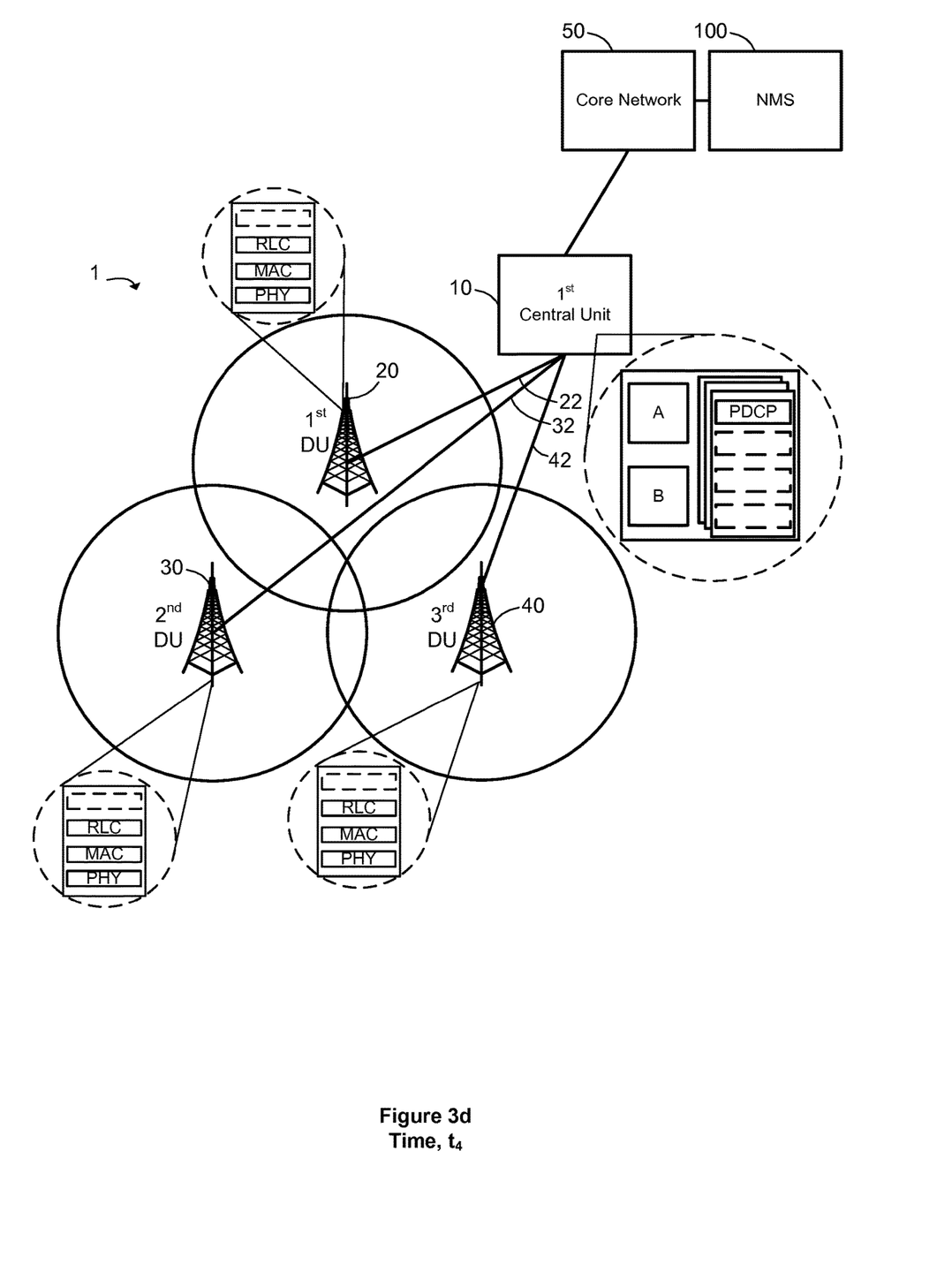

In S11, the NMS 100 sends a first instruction message to each of the first central unit 10 and first, second and third distributed units 20, 30, 40 to implement the functional split D. This is illustrated in FIG. 3c. Upon successful reconfiguration, the first central unit 10 and first, second and third distributed units 20, 30, 40 send a confirmation message to the NMS 100. In response, in S13, the NMS 100 sends a second instruction message to the first central unit 10 to implement the second further processing function B in its second further processing environment. FIG. 3d illustrates the cellular network 1 following this reconfiguration. This embodiment of the disclosure therefore provides the advantage of recognizing that different functional splits have different processing requirements on the central and distributed units so that, upon a trigger for an additional processing function at any one of these units which would otherwise surpass the processing capability of that unit, the functional split may be adapted so that the additional processing function may be implemented whilst maintaining the greatest amount of coordination possible.

Figure 5A:
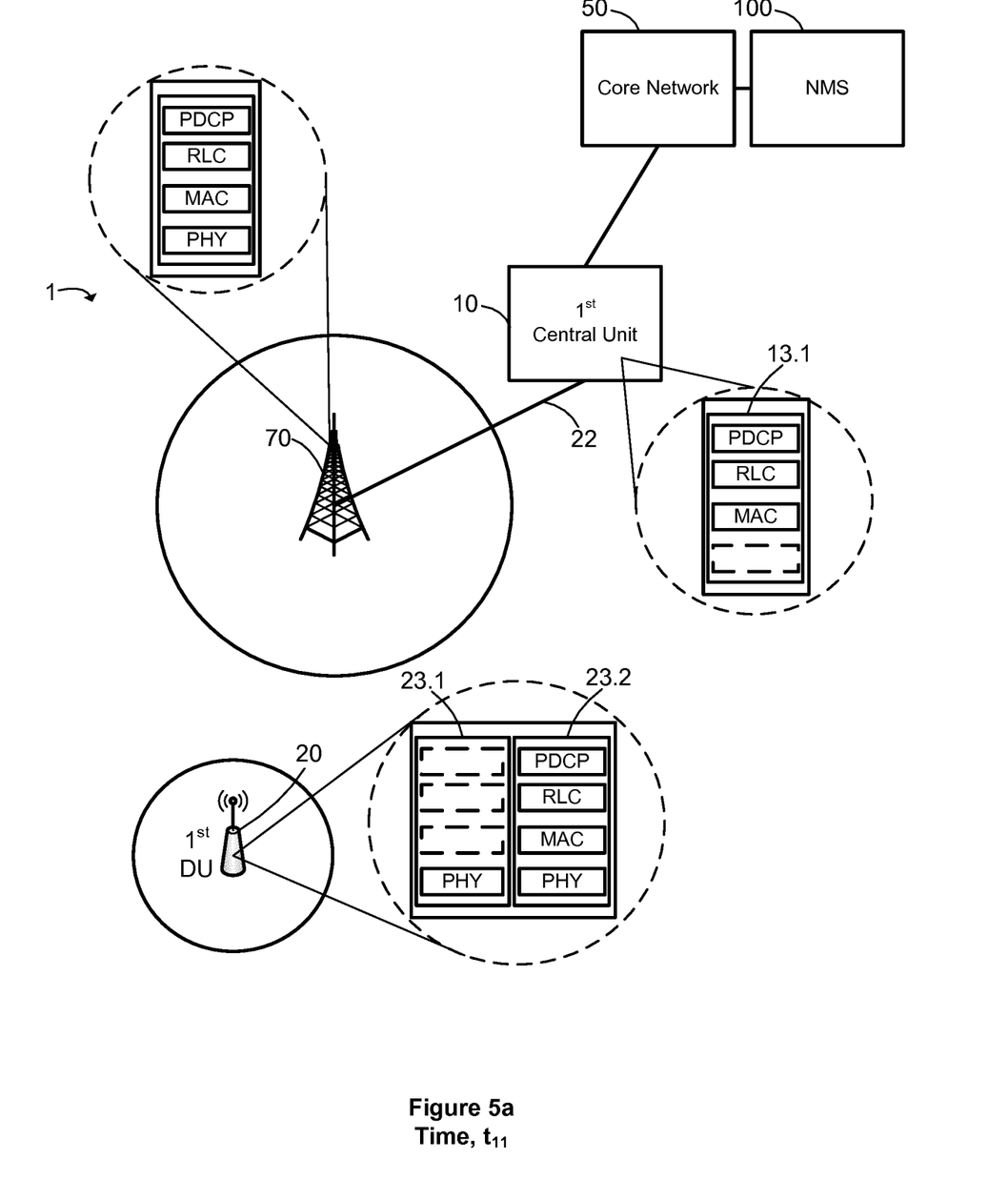
FIGS. 5a and 5b illustrate the network of FIG. 1 at times $t_{11}$ and $t_{12}$ respectively.
Figure 5B:
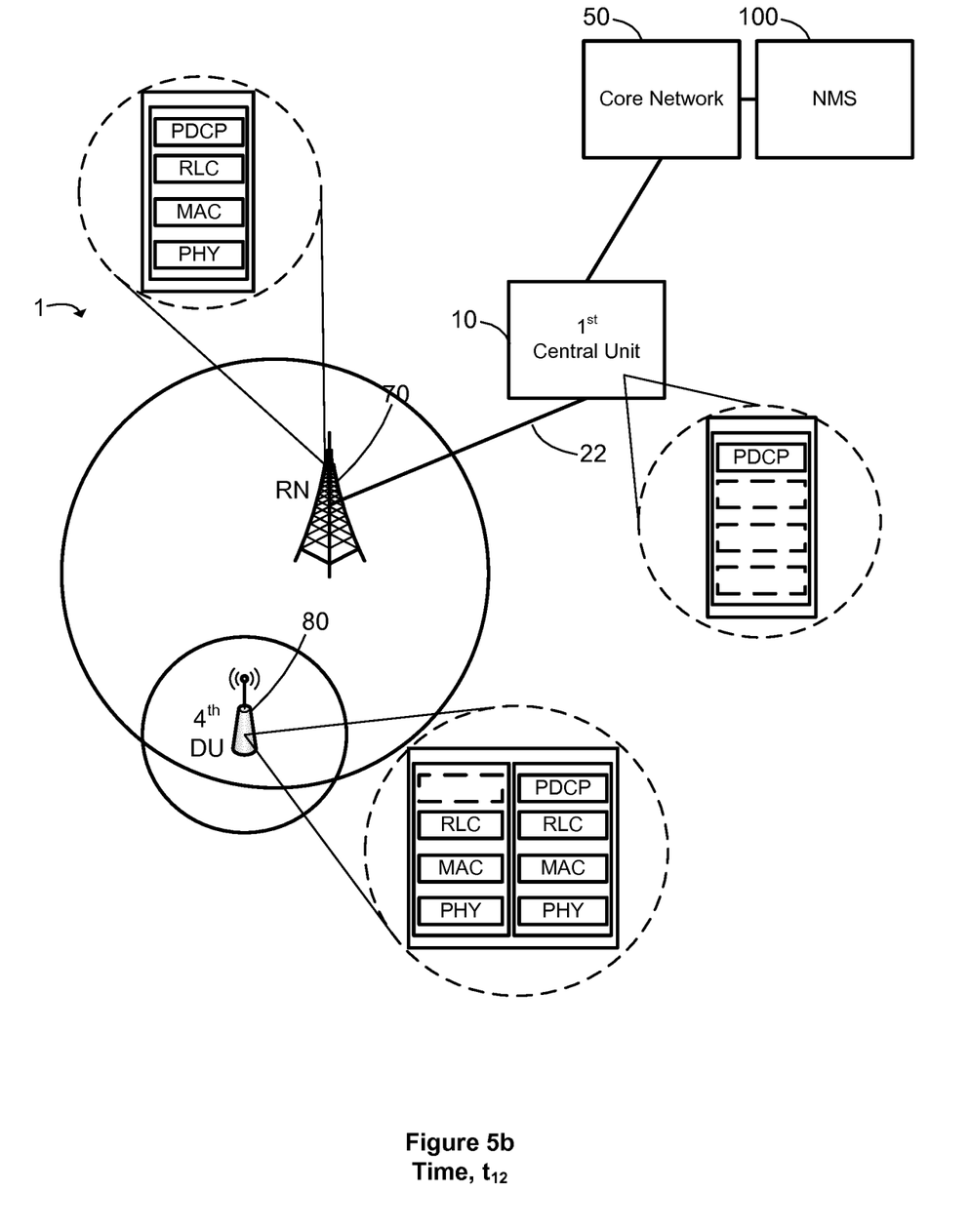
Figure 6:
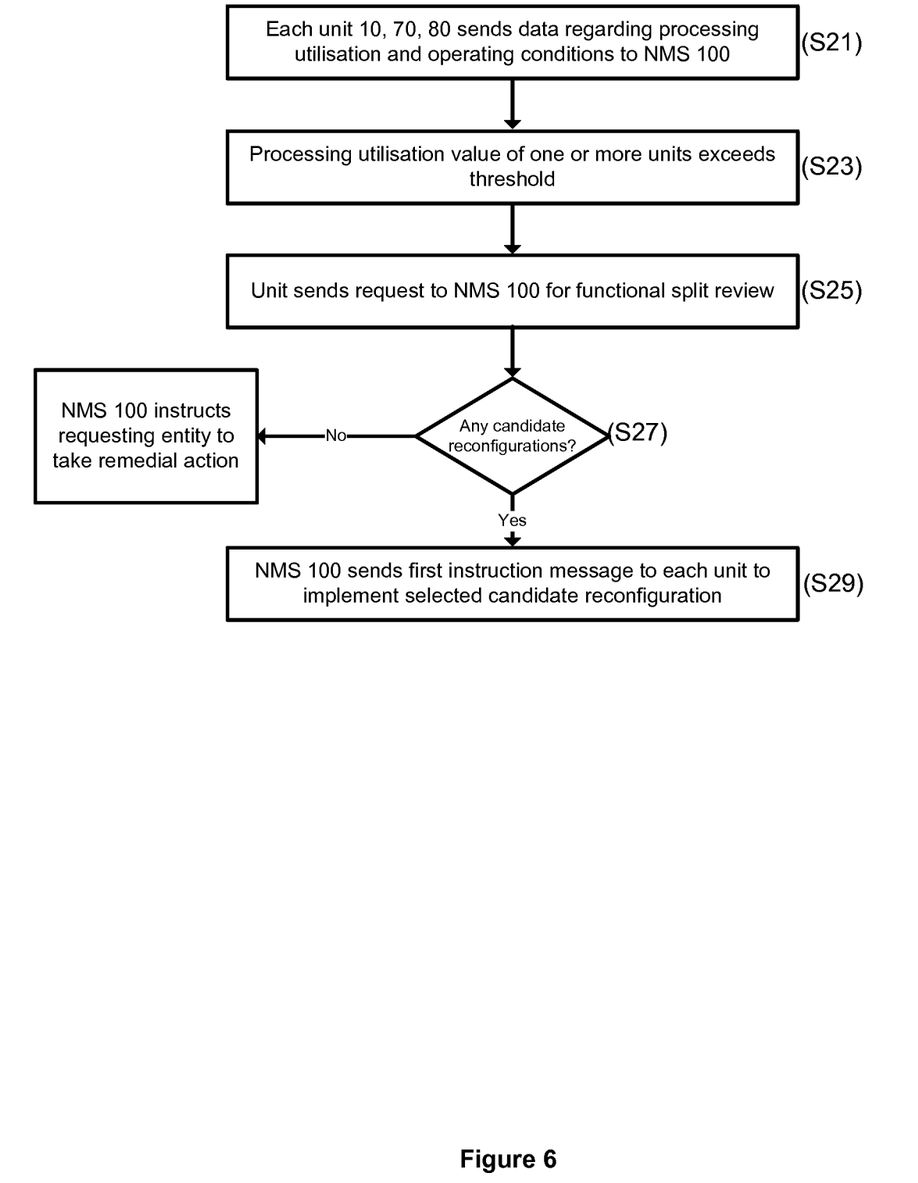
FIG. 6 is a flow diagram of a second embodiment of a method of the present disclosure.

A second embodiment of a method of the present disclosure will now be described with reference to FIGS. 5a, 5b and the flow diagram of FIG. 6. FIG. 5a illustrates the cellular network in which a fourth distributed unit 80 is connected to the first central unit 10 via a relay node 70 via a wireless backhaul. The first, second and third distributed units 20, 30, 40 are not shown (although they may also be connected to the first central unit 10), and the first central unit 10 does not implement further processing functions A or B.

FIG. 5a also illustrates the first central unit 10 and fourth distributed unit 80 implementing functional split B (noted above) in which the communications processor 13.1 of the first central unit 10 implements the MAC, RLC and PDCP functions and a first communications processing environment 83.1 of the fourth distributed unit 80 implements the PHY function. Furthermore, the fourth distributed unit 80 implements a second communications processing environment 83.2 for processing communications for the relay node 70. Similarly, the relay node implements a communications processing environment for processing communications with both the first central unit 10 and fourth distributed unit 80.

In this embodiment, the NMS 100 database identifying the processing utilization values (e.g. in Millions of Instructions Per Second, MIPS, or FLOating Point operations per Second, FLOPS, CPUs, cores) for the first central unit 10 and fourth distributed unit 80 when implementing each functional split (A to E, identified above) is enriched to include processing utilization values at each functional split in different operating conditions, including the amount of user traffic (measured in, for example, combined Mbps) and the backhaul radio conditions (measured in, for example, RSRP between the fourth distributed unit 80 and relay node 70). An example of this database is illustrated in Table 2, below.

TABLE 2

Table illustrating processing utilization values, $P_n$, for each functional split, subdivided based on user traffic and backhaul radio conditions

| Functional Split | User Traffic Conditions | Backhaul Radio Condition | First CU 10 | Relay Node 70 | Fourth DU 80 |
|---|---|---|---|---|---|
| A | <B | <R | $P_{13}$ | $P_{14}$ | $P_{15}$ |
| A | >=B | <R | $P_{16}$ | $P_{17}$ | $P_{18}$ |
| A | <B | >=R | $P_{19}$ | $P_{20}$ | $P_{21}$ |
| A | >=B | >=R | $P_{22}$ | $P_{23}$ | $P_{24}$ |
| B | <B | <R | $P_{25}$ | $P_{26}$ | $P_{27}$ |
| ... | ... | ... | ... | ... | ... |

In S21 of this embodiment, at time $t_{11}$ as shown in FIG. 5a, the first central unit 10 and fourth distributed unit 80 both send data relating to their current processing and operating environments to the NMS 100. This includes a) each unit's current processing resource utilization values, b) each unit's current processing capability, c) the fourth distributed unit's user traffic conditions, and d) the backhaul radio conditions between the fourth distributed unit 80 and relay node 70. These are stored in memory in the NMS 100.

In S23, the processing utilization value of one or more of the first central unit 10, fourth distributed unit 80 and/or relay node 70 exceed a threshold (for example, 95% of their processing resource capability values). In this embodiment, the fourth distributed unit 80 detects that it has exceeded this threshold. In response, in S25, the fourth distributed unit 80 sends a request to the NMS 100 for a functional split review.

In S27, the NMS 100 receives this request and identifies a remedy based on the processing and operating environments in the cellular network 1. This is achieved by the NMS 100 using the latest data on the fourth distributed unit's user traffic conditions and the backhaul radio conditions (stored in memory in S21) to retrieve the first central unit's, relay node's, and fourth distributed unit's processing utilization values at each functional split when operating under those conditions. If at least one of these processing utilization values for the first central unit 10, relay node 70 or fourth distributed unit 80 for all functional splits are above the associated thresholds, then the request is rejected. In this scenario, the NMS 100 sends a response to the fourth distributed unit 80 instructing it to take remedial action to operate within the limits of its operating environment (e.g. restrict user traffic). However, if all processing utilization values for the first central unit 10, relay node 70 and fourth distributed unit 80 for a particular functional split are less than the associated thresholds, then that functional split becomes a candidate reconfiguration.

If there are multiple candidate reconfigurations following S27, then, in this example, the NMS 100 selects the functional split of one of these candidates which has the greatest degree of coordination (i.e. greatest number of functions being implemented in the first central unit 10). If a single candidate reconfiguration is identified in S27, then the functional split of that candidate is selected. In this example, the functional split D (as noted above) is selected.

In S29, the NMS 100 sends a first instruction message to the first central unit 10 and fourth distributed unit 80 to implement functional split D. This is illustrated in FIG. 5b.

This second embodiment has the benefit that a change in functional split takes into account the operating conditions of the distributed unit. The processing requirements due to these operating conditions may change over time depending on various factors (such as number of users, radio interference, etc.) so this second embodiment will select a functional split that is more appropriate for the distributed unit.

In the above embodiments, the central unit and their respective distributed units implement different proportions of the overall set of functions of the protocol in use (LTE in the above example). The skilled person will understand that whole layers of a protocol may be moved between the central unit and distributed unit, or just a part (i.e. function) thereof. Thus, the central unit may implement a first set of protocol functions, and a distribution unit may implement a second set of protocol functions. The first set of functions may be the lowermost function up and including a particular function, and the second set of functions may be all functions above that particular function. In other words, the first and second sets of functions may be distinct.

Furthermore, the distributed units may implement the RF functions of the protocol only, and all other functions may be implemented in the central unit. Still furthermore, the invention may be realized across a cascaded RAN in which the overall set of functions are distributed across (for example) a remote radio head, a distributed unit and a central unit.

It is also possible for the central unit to implement different functional splits, different protocols, and/or different radio access technologies with different distributed units (e.g. via different virtual processing environments). The NMS database may therefore be enhanced to identify the processing utilization values for a plurality of combinations of functional splits across the distributed units. In response to a request resulting in a functional split reconfiguration, the NMS may therefore change the functional split between the central unit and a first distributed unit when it was instead the processing utilization for transmissions relating to a second distributed unit that triggered the request.

In the above embodiments, the NMS included a VIM and orchestrator to perform the embodiments of the method of the invention. However, any other entity in the cellular network may be used instead.

In the first embodiment, the first central unit 10 has several further processing environments for implementing further processing functions. These may include, for example, Multi-access Edge Computing (MEC), content caching, packet routing, and policy control. Furthermore, the request may be to instantiate this function for the first time in the network, or to move it from another location to the first central unit.

In the second embodiment, the processing utilization values for each functional split were subdivided based on user traffic and Reference Signal Received Power (RSRP) values between the fourth distributed unit and relay node. However, this is non-essential and other metrics for measuring access radio conditions and backhaul conditions may be used.

The skilled person will also understand that it is non-essential for the backhaul to be a wireless technology, and a wired interface may be used instead.

The skilled person will also understand that the first and second embodiments may be performed on a periodic basis such that the cellular network dynamically reconfigures to its conditions.

In the above embodiments, it is determined whether the processing utilization values at different functional splits is below a processing capability value. The skilled person will understand that this processing capability value may be more than the current processing capability of the unit, for example if the processors are virtualized and an additional processing capability may be employed (known as "overbooking").

The skilled person will understand that any combination of features is possible within the scope of the invention, as claimed.

The invention claimed is:

1. A method of operating a network management node in a cellular telecommunications network, the cellular telecommunications network having a first central base station unit connected to a first distributed base station unit, the first central base station unit configured to communicate with the first distributed base station unit using either a first functional split in which a first set of protocol functions are implemented by the first central base station unit and a second set of protocol functions are implemented by the first distributed base station unit or a second functional split in which a third set of protocol functions are implemented by the first central base station unit and a fourth set of protocol functions are implemented by the first distributed base station unit, wherein the network management node includes a database of processing resource utilization values each being a value of processing resource utilization for either the first central base station unit or the first distributed base station unit when using either the first functional split or the second functional split, the method comprising:
receiving a current processing resource utilization value and a processing capability value from the first central base station unit and the first distributed base station unit, wherein the first central base station unit communicates with the first distributed base station unit using the first functional split;
determining that the received current processing resource utilization value of at least one of the first central base station unit and first distributed base station unit satisfies a processing threshold; and, in response,
identifying the second functional split based on a comparison of the value of processing resource utilization of each of the first central base station unit and the first distributed base station unit using the second functional split, as stored in the database of processing resource utilization values, to the received processing capability value of at least one of the first central base station unit or the first distributed base station unit; and
causing the first central base station unit and the first distributed base station unit to communicate using the second functional split.

2. The method as claimed in claim 1, wherein the comparison is of the value of processing resource utilization of at least one of the first central base station unit or the first distributed base station unit using the second functional split and operating according to a set of operating conditions to the respective processing resource capability of at least one of the first central base station unit or the first distributed base station unit.

3. The method as claimed in claim 2, wherein the set of operating conditions relates to access radio conditions.

4. The method as claimed in claim 2, wherein the set of operating conditions includes a quality of a connection between the first central base station unit and the first distributed base station unit.

5. The method as claimed in claim 4, wherein the first central base station unit and the first distributed base station unit are connected via a relay node, and the set of operating conditions includes a quality of a connection between the first distributed base station unit and the relay node.

6. A non-transitory computer-readable storage medium storing a computer program product comprising instructions which, when the computer program product is executed by a computer, cause the computer to carry out the method of claim 1.

7. A network management node for a cellular telecommunications network, the cellular telecommunications network having a first central base station unit connecting to a first distributed base station unit, wherein the first central base station unit communicates with the first distributed base station unit using either a first functional split in which a first set of protocol functions are implemented by the first central base station unit and a second set of protocol functions are implemented by the first distributed base station unit or a second functional split in which a third set of protocol functions are implemented by the first central base station unit and a fourth set of protocol functions are implemented by the first distributed base station unit, the network management node comprising:
memory storing a database of processing resource utilization values each being a value of processing resource utilization for either the first central base station unit or the first distributed base station unit when using either the first functional split or the second functional split;
a communications interface adapted to receive data indicating a processing resource utilization value and a processing capability value of the first central base station unit and first distributed base station unit using the first functional split; and
a processor adapted to:
determine that the processing utilization value of the first central base station unit and/or the first distribute base station unit satisfies a processing threshold, and, in response,
identify the second functional split based on a comparison of the processing resource utilization value of each of the first central base station unit and the first distributed base station unit using the second functional split, as stored in the database of processing resource utilization values, to the received processing capability value of at least one of the first central base station unit or the first distributed base station unit, and
cause the first central base station unit and the first distributed base station unit to communicate using the second functional split.

8. The network node as claimed in claim 7, wherein the comparison is of the value of processing resource utilization of at least one of the first central base station unit or the first distributed base station unit using the second functional split and operating according to a set of operating conditions to the respective processing resource capability of at least one of the first central base station unit or the first distributed base station unit.

9. The network node as claimed in claim 8, wherein the set of operating conditions relates to access radio conditions.

10. The network node as claimed in claim 8, wherein the set of operating conditions includes a quality of a connection between the first central base station unit and the first distributed base station unit.

11. The network node as claimed in claim 10, wherein the first central base station unit and the first distributed base station unit are connected via a relay node, and the set of operating conditions includes a quality of a connection between the first distributed base station unit and the relay node.

12. The network node as claimed in claim 7, being a network function virtualization orchestrator.

\* \* \* \* \*